No. 661,914. Patented Nov. 13, 1900.
G. P. KAHLER.
LAWN MOWER.
(Application filed July 15, 1899.)
(No Model.)
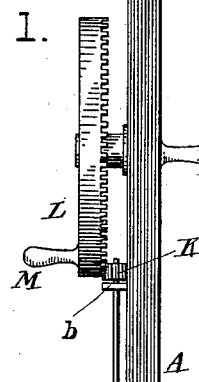
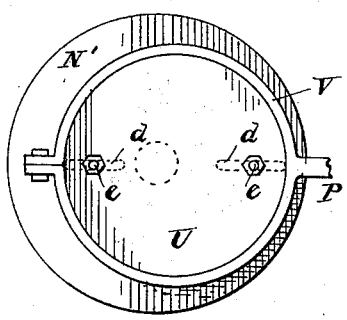
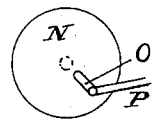
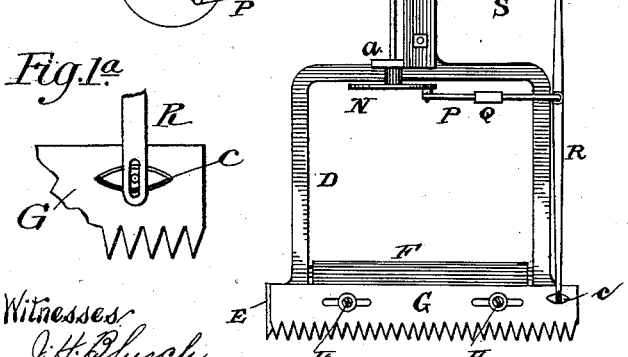
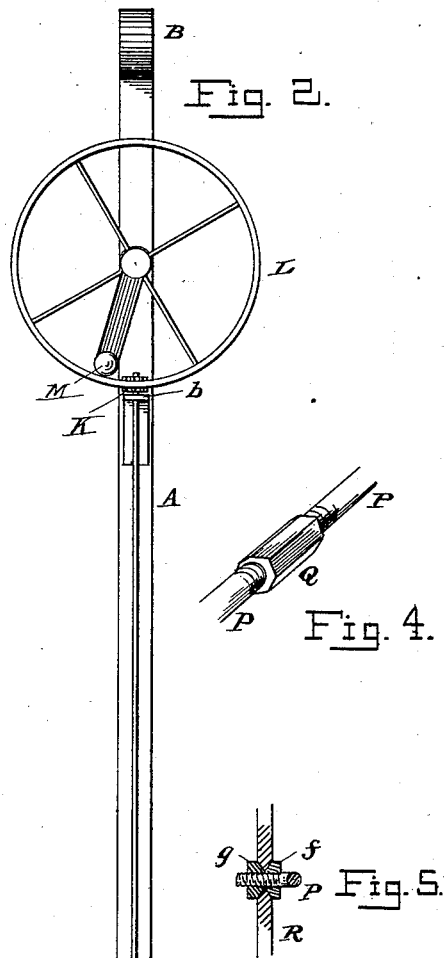
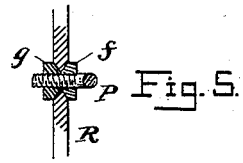
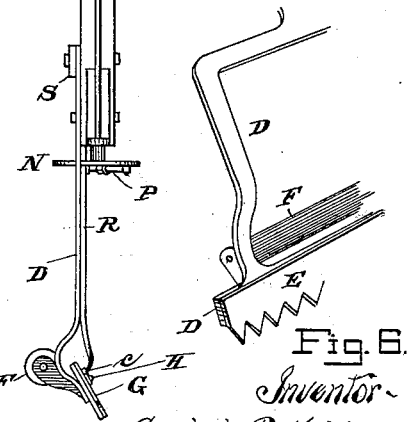
Witnesses
J. H. Blusch
Walter Andrew.
Inventor
Gottlieb P. Kahler
By L. N. Thurlow
ATTY.
THE NORRIS PETERS CO., PHOTO-LITHO., WASHINGTON, D. C.

UNITED STATES PATENT OFFICE.

GOTTLIEB P. KAHLER, OF DOUGLAS, ILLINOIS.

LAWN-MOWER.

SPECIFICATION forming part of Letters Patent No. 661,914, dated November 13, 1900.

Application filed July 15, 1899. Serial No. 723,895. (No model.)

*To all whom it may concern:*

Be it known that I, GOTTLIEB P. KAHLER, a citizen of the United States, residing at Douglas, in the county of Knox and State of Illinois, have invented certain new and useful Improvements in Lawn-Mowers; and I do hereby declare that the following is a full, clear, and exact description of the invention, which will enable others skilled in the art to which it appertains to make and use the same.

This invention relates to lawn-mowers of that class which are driven by hand.

One object of my invention is to provide a lawn-mower of simple construction, which will be cheap and require but little power to operate it.

A further object is to furnish a mower of this character in which the cutting portion can be driven fast or slow, according to the kind of material to be cut.

A still further object is to provide a mower wherein the cutting arrangement is entirely independent of the carrying-wheels, whereby the movement of the said mower over the ground does not affect the cutting.

In the annexed drawings, Figure 1 is a plan view of the mower. Fig. 1$^a$ is a detail view of a connection for operating the cutter-bar. Fig. 2 is an edge or side view thereof. Fig. 3 is a detail view of a modified form of driving device. Fig. 3$^a$ is a detail view of the form of driving arrangement shown in Figs. 1 and 2. Fig. 4 is a perspective view of means for adjusting a pitman-rod used as part of the operating portion. Fig. 5 is a sectional view of a coned connection for the said pitman. Fig. 6 is a detail of a frame carrying the cutter.

A is a bar of wood having a breast-piece B at the upper end and a handle at C. At the lower end of the bar is attached an arched frame D of considerable height, having affixed thereto a sickle E. At the rear of such frame is a roller F, which in practice supports the machine in the same manner as the usual carrying-wheels on the older form of this class of devices. A sickle-bar G is mounted on the sickle E, being held in place by screws H, entering the sickle E. Slots in the bar G, through which the screws pass, guide the latter in its movements. Parallel with the bar A is a shaft J, having bearings on the said bar A at $a$ and $b$. The upper end of the shaft carries a pinion K, driven by a wheel L, journaled on the bar A, as shown. Said wheel L is provided with a handle M, by which it is driven. The lower end of the shaft carries a wheel N, which is slotted at O, Fig. 3$^a$, and the end of a pitman P is held therein and may be adjusted to or from the center to obtain more or less stroke, as is obvious. The method of adjusting the pitman within the slot O is not important and no particular means is illustrated; but a stud within the slot, locked by means of a suitable nut, may be employed, to which the pitman may be loosely attached in suitable manner. The pitman is divided into two sections, as shown in Fig. 4, and an adjustable threaded sleeve connects the two and by which the pitman may be shortened or lengthened or any looseness taken up. The opposite end of the pitman is pivotally attached to a lever R, and such lever is pivoted to an arm S, secured to the bar A. The lower end of the lever is slotted, as shown in Fig. 1$^a$, and a projecting lug C carries a pin to engage the said slot. It will be seen that by revolving the wheel L movement is transmitted through the pinion K and shaft J to the wheel N and pitman P to the lever R. The latter being held at its upper end will vibrate as the wheel N revolves, causing the sickle-bar to vibrate in the direction of its length, as in the ordinary reaper. Since the end of the lever moves in the arc of a circle and the cutter-bar has a motion in a straight line at right angles to the said lever, it will be seen that the slot in the end of the lever will permit free movement of the parts.

The advantage of my mower is that when driven by hand any speed of the sickle-bar is attainable to suit the work being done. When cutting fine tough grass, the machine is moved slowly over the ground, but the sickle is driven rapidly. For ordinary work the machine may be moved faster and the speed of the sickle reduced. It is seen that the speed of movement of the sickle-bar is not dependent on the speed the machine travels.

In operation the piece B is placed against the breast, the left hand grasps the handle C, and the right the handle M on the wheel L. The mower is carried on the roller F, and the latter is used as a fulcrum on which to swing the mower vertically in order to obtain more or less height of the teeth, as is obvious. By this means the grass may be cut at any elevation desired. Fences, trees, and other obstacles can be worked up to without leaving any grass stand that would afterward have to be cut with a sickle, as is the case with the old forms of lawn-mowers. An advantage in this mower also lies in the fact that grass or weeds can be readily cut, no matter how high they may be.

In Fig. 5 I show the form of pivotal connection between the pitman P and lever R. The said lever is countersunk on both sides at the opening for the said pitman, and cones $f$ and $g$ are screwed onto the threaded extremity of such pitman to snugly fit in said countersunk portions, as shown. By this means all wear and rattle may be easily taken up.

A further advantage in my form of mower is that the frame D forms a yoke of considerable height, through which the tall grass and weeds may pass as they are cut without interruption. I am aware that there is a mower constructed something after the same manner as mine in this regard, but its carrying wheels or trucks are immediately in the rear, and consequently stop the cut material as it falls; but since the roller F of my device is located immediately under the cutter-bar free passage of the cut material must result, an advantage that will be appreciated. Furthermore, I am not aware of a mower which combines with it some means for changing the speed of travel of the cutter-bar by means of an extensible pitman and plate, and I believe the same is new.

In Fig. 3 I show a modified form of the adjustment for carrying the pitman and changing its stroke. The wheel N' is slotted at $d\,d$, and a plate U, carrying bolts $e\,e$, is clamped on said wheel by passing the bolts through the slots $d$. By this means it will be seen that the plate may be adjusted to any position desired. It is given an eccentric movement by its adjustment and a strap V is clamped around it and forms part of the pitman. By loosening the bolts and slipping the plate as far as desired any stroke of the pitman can be obtained.

Having described my invention, I claim—

In a lawn-mower for hand use, a push-bar A, provided with a handle C and breast portion B, a shaft J, at the side of the said bar, a pinion K on the upper end thereof, a wheel L for driving the same, and revolving the shaft, a revolving plate N' on the forward end of the shaft, a yoke D on the forward end of the push-bar, a roller F journaled at the under side of said yoke, a sickle-bar G mounted on the sickle E and adapted to vibrate thereon, slots in said sickle-bar, screws H in the sickle and passing through said slots for retaining the sickle-bar in place and guiding it in its reciprocating movements, an arm S secured to push-bar, a lever R pivoted to the outer end thereof, the same being loosely attached to the sickle-bar, a pitman pivoted to said lever consisting of the portions P and the sleeve Q for changing the length of the said pitman, the plate U secured to the said plate N', there being slots $d$ in said latter plate, bolts $e$ in the plate U for holding the latter and permitting adjustment thereof, and a strap V surrounding the plate U and attached to the pitman all arranged as set forth.

In testimony whereof I affix my signature in presence of two witnesses.

GOTTLIEB P. KAHLER.

Witnesses:
C. JOHNSON,
A. KEITHLEY.